United States Patent [19]

Hatakeyama

[11] 4,406,218
[45] Sep. 27, 1983

[54] COOKING UTENSIL
[75] Inventor: Koichi Hatakeyama, Tokyo, Japan
[73] Assignee: Jusco Kabushiki Kaisha, Osaka, Japan
[21] Appl. No.: 366,675
[22] Filed: Apr. 8, 1982
[30] Foreign Application Priority Data May 29, 1981 [JP] Japan ................................. 56-82392

[51] Int. Cl.³ ............................................. A47J 36/38
[52] U.S. Cl. ...................................... 99/401; 99/340; 99/400; 99/447
[58] Field of Search ................. 99/400, 401, 339, 340, 99/413, 447, 450; 220/366, 367

[56] References Cited
U.S. PATENT DOCUMENTS 1,723,413 8/1929 Drehmann ........................ 99/447 X
1,862,420 6/1932 O'Brien ............................ 99/447 X
2,057,421 10/1936 Dickson ........................... 99/447 X

FOREIGN PATENT DOCUMENTS 537638 10/1931 Fed. Rep. of Germany ........ 99/447

Primary Examiner—Billy J. Wilhite
Assistant Examiner—Christine A. Peterson
Attorney, Agent, or Firm—Wenderoth, Lind & Ponack

[57] ABSTRACT

A pan-type cooking utensil comprising a pan-shaped main body, a dome-shaped cover detachably fitted on the main body and having an exhaust cylinder integrally extending upwardly from the cover in the center thereof, a lid pivoted to the exhaust cylinder for opening and closing the exhaust cylinder, a rope extending through the exhaust cylinder and having one end secured to the cover and the other end connected to a lift mechanism. The main body is provided with hot air inlets.

7 Claims, 3 Drawing Figures

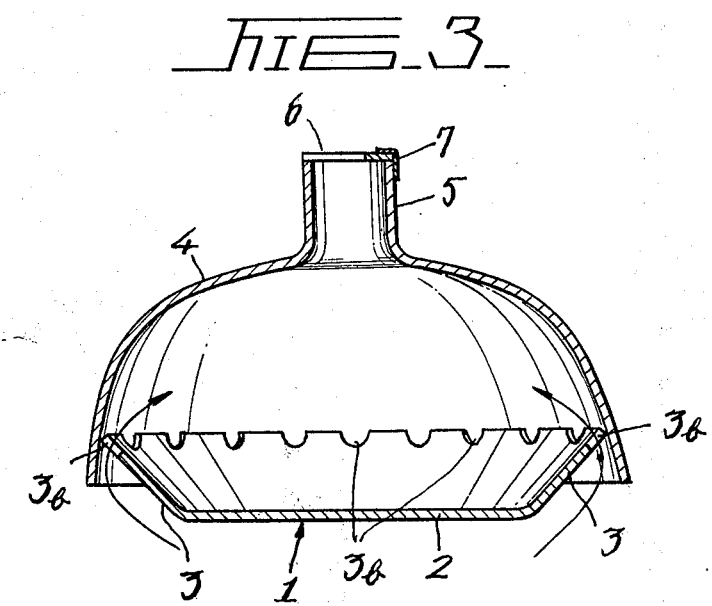

COOKING UTENSIL

BACKGROUND OF THE INVENTION

1. Field of the Art

This invention relates to a pan-type cooking utensil for cooking meats, fishes and vegetables.

2. Background of the Art

In the past, a frying pan has been exclusively employed for frying foods such as meats, fishes and vegetables in an egible oil bath therein or toasting such foods on an egible oil layer laid on the bottom of the pan. A sauce pan has been exclusively employed for boiling such foods.

SUMMARY OF THE INVENTION

The purpose of the present invention is to provide a versatile pan-type cooling utensil which can be variously employed for broiling, toasting, smoking and steaming the above-mentioned foods.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the same in any way.

BRIEF DESCRIPTION OF THE DRAWINGS

FIG. 3 is a vertically sectional view of a third embodiment of the pan-type cooking utensil constructed in accordance with the present invention with some components thereof eliminated therefrom.

PREFERRED EMBODIMENTS OF THE INVENTION

Figure 1:
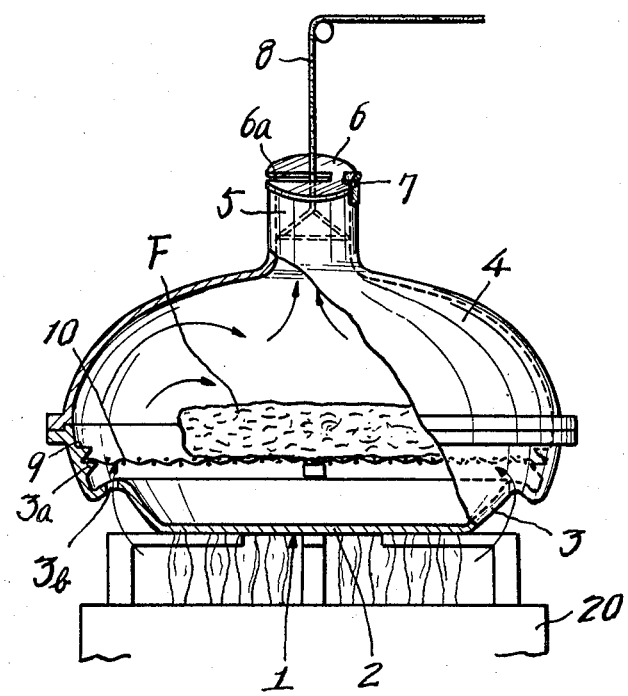
FIG. 1 is an elevational view in partial section of a first embodiment of the pan-type cooking utensil constructed in accordance with the present invention with a portion thereof broken away to show the interior of the utensil.

The present invention will be now described referring to the accompanying drawings and more particularly, to FIG. 1 thereof in which the first embodiment of the pan-type cooking utensil of the invention is shown. The cooking utensil generally comprises a pan-shaped main body 1 of substantially U-shaped cross-section including a flat bottom wall 2 and a side wall 3 integrally extending upwardly and radially outwardly from the periphery of the bottom wall 2 at an angle with respect to the plane of the bottom wall 2; and a dome-shaped cover 4 open at the top and bottom and detachably fitted on the main body 1 to seal the interior of the main body 1 from the atmosphere.

The side wall 3 includes a flange 3a extending about the upper edge of the side wall 3 and is provided with a plurality of circumferentially spaced hot air inlets 3b (only one hot air intake 3b is shown in FIG. 1). The flange 3a first extends horizontally, then outwardly downwardly at an angle to the horizontal portion and finally upwardly outwardly at an angle to the downwardly extending portion. A hollow cylindrical exhaust member 5 extends integrally and uprightly from the top of the dome-shaped cover 4 in the center of the cover and is open at the top and bottom. The open top of the exhaust member 5 is normally closed by a circular lid 6 having an elongated opening 6a which extends from a point about the periphery through the center of the lid and terminates short of the diametrically opposite point about the lid periphery and suitably connected to the side wall of the exhaust member by means of a hinge or the like 7 for pivotal movement relative to the exhaust member between the opening and closing positions. A rope 8 extends through the opening 6a in the lid 6 in the center of the latter with the lower end suitably secured to the inner surface of the exhaust member 5 and the upper end connected to a suitable conventional lift mechanism (not shown).

The inner construction of the main body 1 will be now in detail described for illustration purposes. A plurality of inwardly extending projections 9 (only one projection 9 is shown in FIG. 1) are provided on the inner surface of the side wall 3 in a circumferentially spaced relationship and a screen 10 extends across the interior of the side wall 3 and is secured at the periphery to the projections 9 under tension. Alternatively, although not shown, such projections 9 may be provided on the upper or inner surface of the bottom wall 2 and the screen 6 may extend across the interior of the side wall 3 and be secured at the periphery to the projections 9 within the scope of the present invention.

Figure 2:
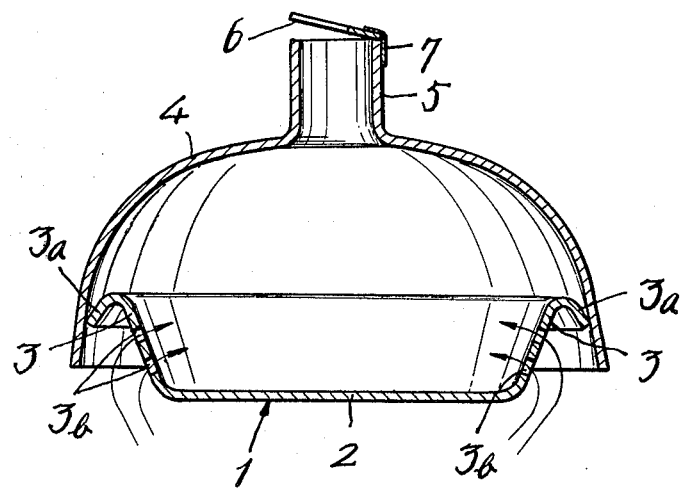
FIG. 2 is a vertically sectional view of a second embodiment of the pan-type cooking utensil constructed in accordance with the present invention with some components thereof eliminated therefrom.

Referring now to FIG. 2 in which the second embodiment of the pan-type cooking utensil of the invention is shown.

The second embodiment is substantially similar to the first embodiment as described hereinabove except for the construction of the side wall 3 and the disposition of the hot air inlets 3b. In the second embodiment, the peripheral flange 3a at the upper edge of the side wall 3 extends downwardly at an angle to the plane of the upper edge of the side wall 3 and a plurality of hot air inlets 3b are provided in the side wall in different intermediate positions between the upper and lower edges of the side wall 3 in a circumferentially spaced relationship.

FIG. 3 shows the third embodiment of the pan-type cooking utensil of the present invention and the third embodiment is also substantially similar to the foregoing embodiments except for the construction of the side wall 3 and the disposition of the hot air inlets 3b. In this embodiment, the side wall 3 is eliminated therefrom the flange 3a as provided on the side wall 3 in the preceding embodiments and the hot air inlets 3b which are in the form of a notch are provided at the upper edge of the side wall 3 in a suitably circumferentially spaced relationship. In FIGS. 2 and 3, the rope 8, projections 9 and screen 10 as shown in FIG. 1 are not shown for the simplification of the showing.

When the cover 4 is placed on the main body 1 in the second and third embodiments of the cooking utensil of the present invention, the cover 4 is preferably placed on the main body to the degree that the lower edge of the cover extends to an intermediate position along the height of the side wall 3 to shield the hot air inlets 3b from the atmosphere whereby hot air is prevented from escaping through the inlets 3b into the atmosphere.

With the above-mentioned construction and arrangement of the components of the cooking utensil according to the present invention, when the cooking utensil is used for cooking food, the main body 1 of the utensil is placed on a gas kitchen range 20, food such as meat, for example, is placed on the screen 10, the cover 4 is lowered onto the main body 1 and the kitchen range 20 is ignited.

The air heated by the flames generated from the ignited kitchen range strikes against the annular upwardly inwardly extending recess in the undersurface of the horizontal and downwardly extending portions of the peripheral flange 3a on the side wall 3 and then flows through the hot air inlets 3b in the flange into the cavity defined by the main body 1 and cover 4 (the first embodiment). In the second and third embodiments of the cooking utensil as shown in FIGS. 2 and 3, the heated air flows through the hot air inlets 3b in the body of the side wall 3 through or the hot air inlets 3b at the upper edge of the side wall 3 into the cavity. In this way, the food F is toasted from above by the heated air. When the meat F is toasted in the manner mentioned above, fat oozes out of the meat F and drips down onto the heated bottom wall 2 of the main body 1 through the screen 10. The fat is burnt on the heated bottom wall 2 to generate vapor and smoke which strike against the meat F from below.

The air heated by the flames generated by the ignition of the gas cooking range flows through the hot air inlets 3b into the cooking utensil cavity as mentioned hereinabove and then along the inner surface of the dome-shaped cover in convection as shown by the arrows in FIG. 1 to heat the meat F from above.

Thus, the meat F on the screen 10 is applied thereto the heated air, vapor and smoke from both above and below to be toasted, broiled, steam and smoked to be sufficiently cooked.

Furthermore, according to the present invention, since the dome-shaped cover 4 is provided with the cylindrical exhaust member 5, if the cooking degree on the meat is desired to be controlled, the lid 6 is partially opened by a degree depending upon the desired cooking degree to allow a portion of the vapor, smoke and heated air to escape from the cavity defined by the main body and cover through the exhaust member 5 into the atmosphere to thereby control the cooking degree on the meat.

As mentioned hereinabove, although the rope 8 extends through the center of the exhaust member 5 and is suitably secured at the lower end to the inner surface of the exhaust member 5 with the upper end connected to the conventional lift mechanism (not shown), since the lid 6 on the exhaust member 5 is provided with the opening 6a therein, the lid 6 can be opened and closed without being interfered with the rope 8.

When a cooking operation on the meat F in the cooking utensil has completed, the lift mechanism (not shown) is operated to haul the rope 8 up to raise the cover 4 from the main body 1 so that the cooked food or meat F can be taken out of the utensil.

When a next cooking operation is conducted on new food such as meat, fish or vegetable in the cooking utensil, the new food is placed on the screen with the cover being raised from the main body and the lift mechanism is operated to lower the rope until the cover is properly placed on the main body. Thereafter, the gas range is ignited again to cook the food in the manner mentioned hereinabove.

The above-mentioned lift mechanism may be a manual or automatic lift mechanism. And since the cover can be placed onto and raised from the main body by lowering the rope up and hauling the same up, the handling of the cover is convenient even if the cooking utensil is of large type. In addition, since the cover can be lowered onto and raised from the main body by the rope in the cooking operation without being put aside to a place adjacent to the gas range, the cover does not occupy any extra space unnecessary for cooking.

While the present invention has been described in conjunction with the embodiments described herein, it is evident that many alternatives, modifications and variations will be apparent to those skilled in the art. Accordingly, the present invention is intended to embrace all such alternatives, modifications and variations and fall within the spirit and scope of the appended claims.

What is claimed is:

1. A pan-type cooking utensil comprising a pan-shaped main body having hot air inlets, a dome-shaped cover detachably fitted on said main body covering said hot air inlets and having an exhaust member integrally and upwardly extending from said cover in the center of the cover, said exhaust member being open at the upper and lower ends, a lid pivotably secured to said exhaust member for opening and closing the exhaust member and having an elongated opening and a rope extending through said opening with the lower end secured to said exhaust member and the upper end connected to a lift mechanism for lowering and raising said cover onto and from said main body.

2. The pan-type cooking utensil as set forth in claim 1, in which said main body includes a bottom wall and a side wall integrally extending radially outwardly from the periphery of said bottom wall at an angle with respect to the plane of the bottom wall.

3. The pan-type cooking utensil as set forth in claim 2, said side wall has a flange extending along the upper peripheral edge of the side wall and said hot air inlets are provided in said flange in a circumferentially spaced relationship.

4. The pan-type cooking utensil as set forth in claim 2, in which said hot air inlets are provided in said side wall in different intermediate positions between the upper and lower edges of the side wall along the height of the side wall in a circumferentially spaced relationship.

5. The pan-type cooking utensil as set forth in claim 2, in which said hot air inlets are provided at the upper edge of said side wall in a circumferentially spaced relationship.

6. The pan-type cooking utensil as set forth in claim 1, further including projections integrally extending radially inwardly from the inner surface of said side wall and a screen extending across the interior of the side wall and secured at the periphery to said projections.

7. The pan-type cooking utensil as set forth in claim 5, in which said hot air inlets are in the form of a notch.

* * * * *